Patented July 29, 1952

2,605,256

UNITED STATES PATENT OFFICE 2,605,256

USE OF MERCAPTANS IN COPOLYMERIZATION OF VINYL SULFIDES WITH ACRYLONITRILE

Wendell R. Conard, Kent, and Chris E. Best, Franklin Township, Ohio, assignors to The Firestone Tire & Rubber Company, Akron, Ohio, a corporation of Ohio No Drawing. Application June 2, 1949, Serial No. 96,833

10 Claims. (Cl. 260—79.7)

This invention relates to modification of the copolymerization of a vinyl sulfide and acrylonitrile, methacrylonitrile or ethacrylonitrile, using a mercaptan modifier.

The mercaptan modifier is from the class consisting of alkyl, aryl, furyl, and furfuryl mercaptans. The alkyl substituents may be substituted or cyclic. The class of modifiers may, therefore, more precisely be defined as consisting of the alkyl, aryl, furyl, and furfuryl mercaptans including hydrocarbon-substituted alkyl and cycloalkyl mercaptans, said alkyl, hydrocarbon-substituted alkyl and cycloalkyl each containing one to twelve carbon atoms. It includes, for example, methyl mercaptan, ethyl mercaptan, the various propyl, butyl, amyl, hexyl, heptyl, octyl, nonyl, decyl, undecyl and dodecyl mercaptans (including isopropyl and n-propyl, n-butyl, sec.-butyl, and tert.-butyl, etc.), cyclohexyl, cyclopentyl mercaptans, etc., benzyl mercaptan, etc., furyl mercaptan, furfuryl mercaptan, thiophenol, thiotoluol, thio-alpha-naphthol, thio-beta-naphthol, the thiocresols, the thioxylenols, etc. It includes mixed mercaptans, e. g., those obtained as a by-product of petroleum refining and those obtained from a mixture of by-product hydrocarbons derived from petroleum refining, etc.

Modifiers of this class cause the production of copolymer resins which are more plastic and therefore more easily worked than the unmodified resins. Likewise, the modified copolymers swell or dissolve more readily in solvents than do the unmodified resins. Although the invention is applicable to copolymerization of any vinyl sulfide with any acrylonitrile derivative, its preferred application is in the modification of those copolymers which are difficultly workable or difficultly swellable or soluble in solvents, and as set forth herein is limited to modification of copolymers obtainable from (1) vinyl sulfides containing a benzyl, phenyl, or alkyl group of one to four carbon atoms and (2) acrylonitrile, methacrylonitrile, or ethacrylonitrile.

The mercaptans improve the plasticity and solubility of the copolymers, and may affect their toughness. The amount of modifier employed determines the extent of the modification. Equal molecular proportions of the different mercaptans modify to substantially the same extent. The use of a large amount of modifier may embrittle the copolymer.

Although the invention will be described more particularly with respect to the modification of emulsion copolymerization, the mercaptans also modify copolymerization by other processes such as mass copolymerization, solution copolymerization, etc. The process of copolymerization may vary widely. The temperature range may vary and although temperatures of 10 to 60° C. are preferred, the process is not limited thereto. Different catalysts, etc., may be employed. All of the monomers may be present at the start of the copolymerization or may be added in increments during the reaction. The concentration of the mercaptan may be varied from, for example, 0.2 to 5.0 parts of mercaptan per 100 parts of total monomer used, and has general application to the modification of copolymerization of the said monomers regardless of the particular method of copolymerization.

In carrying out the reaction air is excluded by replacement with nitrogen, because oxygen inhibits the polymerization. The ratio of the vinyl sulfide to the acrylonitrile, etc. may be varied. If more than one molecular weight of sulfide is used for each molecular weight of acrylonitrile, etc., the excess sulfide does not enter into the reaction. The higher the percentage of acrylonitrile, etc. entering into the reaction, the more difficult the copolymer is to mold or dissolve, etc. Generally an excess of acrylonitrile, etc. will be employed in the reaction mixture, although all of the excess will not necessarily enter into the copolymer. From one to five molecular equivalents of the acrylonitrile, etc. may be used in the reaction for each molecular equivalent of sulfide. A preferred copolymer is constituted of 1.0 to 1.25 molecular equivalents of the acrylonitrile, etc. to each molecular equivalent of the vinyl sulfide.

The higher the molecular weight of the sulfide, the more soluble and plastic is the resulting resin. Therefore, in general the process is of greatest value in the modification of copolymers obtained from the lower molecular weight sulfides and herein is limited to modification of the copolymerization of acrylonitrile, methacrylonitrile or ethacrylonitrile with the benzyl and phenyl vinyl sulfides and those alkyl vinyl sulfides which contain one to four carbon atoms in the alkyl group. These alkyl vinyl sulfides include those containing a methyl, ethyl, n-propyl, isopropyl, n-butyl, sec.-butyl or tert.-butyl group.

The plasticities specified below were determined by pressing 0.50 gram samples of the resins between polished plates in a Carver laboratory press at 2000 pounds per square inch at 160° C. The area of the resulting fused disc measured in square millimeters is the plasticity.

EXAMPLE 1

To illustrate the effect of the modifier in the vinyl sulfide reaction, the following formula was used:

| | | |
|---|---|---|
| Methyl vinyl sulfide | grams | 108.0 |
| Acrylonitrile | do | 92.0 |
| Distilled water | cc | 800 |
| Ammonium persulphate | grams | 6.4 |
| Aquarex D (sodium lauryl and myristyl sulfates) | grams | 10.0 |
| Sodium bicarbonate | do | 12.8 |

The sodium bicarbonate is present as buffer. Carrying out the reaction in a two-liter, three-neck, round-bottom flask equipped with reflux condenser, thermometer and stirrer, and immersed in a bath to obtain controlled temperature, with passage of nitrogen through the flask throughout the reaction, the results obtained, using different temperatures and different amounts of mixed-amyl mercaptan as additional modifier, are illustrated in the following table:

| Mercaptan | Bath Temp. | Reaction Temp., Maximum | Yield | Plasticity |
|---|---|---|---|---|
| cc. | °C. | °C. | Percent | |
| 0.6 | 35–40 | 48 | 70 | 1,598 |
| 1.0 | 35 | 56 | 85 | 1,650 |
| 2.0 | 35 | 56 | 83 | 1,750 |
| 4.0 | 40 | 56–60 | 81 | 1,860 |
| 6.0 | 40 | 56 | 83 | 2,016 |

The table indicates that the use of increasing amounts of mercaptan gives a more plastic product.

The following table shows the difference in solubility in various solvents between unmodified copolymer of methyl vinyl sulfide and acrylonitrile prepared as above, and modified copolymer so prepared in the production of which there is used at least 0.8 part by weight of the amyl mercaptan per 100 parts of total monomer:

*Solubility table*

| Solvent | Unmodified Resin | Modified Resin |
|---|---|---|
| Nitromethane | Swells strongly | Soluble (warm). |
| Nitropropane | do | Do. |
| Cyclohexanone | do | Do. |
| Ethylene Chloride | do | Soluble (hot). |
| Ethylene Chlorhydrin | do | Do. |
| Epichlorhydrin | do | Soluble (warm). |
| Dimethyl Formamide | Swells very strongly | Soluble (cold). |
| Mesityl Oxide | Swells | Soluble (warm). |

The above tests were made with no more than moderate stirring. High speed agitation produced apparent solution of the unmodified resin in nitromethane, nitropropane, cyclohexanone, and ethylene chloride, but these were merely dispersions which gelled on standing. The solution of the modified copolymer at 60° C. in nitromethane was clear and a true solution, visibly distinguishable from the mentioned dispersions which were merely translucent and not clear. Any copolymer of methyl vinyl sulfide and acrylonitrile, constituted of 1 to 1.25 molecular equivalents of the latter for each molecular equivalent of the former, which is sufficiently soluble in nitromethane at 60° C. to produce a ten per cent (by weight) solution, is new.

Mixtures of some solvents have more power than the individual solvents. For instance, nitromethane and ethylene chloride is more powerful than either alone. A mixture of nitromethane and ethylene chlorhydrin is the best mixture yet found.

EXAMPLE 2

A copolymer was prepared from the following charge:

| | | |
|---|---|---|
| Methyl vinyl sulfide | grams | 54 |
| Acrylonitrile | do | 46 |
| Water | cc | 400 |
| Ammonium persulfate | grams | 3.2 |
| Sodium bicarbonate | do | 6.4 |
| Aquarex D | do | 5 |
| Mixed-amyl mercaptan | cc | 0.8 |

The charge was agitated at 40° C. for two hours. The resulting copolymer was found to be at least 10 per cent soluble in hot nitromethane.

Also the modified copolymer was soluble at room temperature in a mixture of equal volumes of nitromethane and ethylene chlorhydrin to give a clear, viscous (500–2000 cps.) solution at a concentration of 10 per cent. Films cast from this solution, when dry, were coherent and strong and of good clarity and appearance.

Copolymer prepared as above but omitting the mercaptan formed a gel in hot nitromethane and was not soluble to the extent of 10 per cent. This unmodified copolymer swelled strongly but did not dissolve in a 1:1 mixture of nitromethane and ethylene chlorhydrin, even on heating. Such a gel of 10 per cent concentration, could be broken to a "pseudo" solution by violent agitation such as is produced by a Waring Blendor, but this was opalescent and opaque and rather thin, and so unstable that on standing it tended to revert to a gel. Films produced from it were irregular and developed non-coherent portions on drying which were not apparent in films from solutions of the modified copolymer which it is believed were true solutions whereas the unmodified copolymers produced merely dispersions of gel particles.

EXAMPLES 3(a) to 3(e)

The charge of Example 1 was used in this test, but various mercaptans were used as modifiers. The mercaptans are listed in the following table, together with the amounts of each, and the plasticities of the products. All plasticities are higher than that for unmodified resin.

| Example | Mercaptan | Amount | Yield | Plasticity |
|---|---|---|---|---|
| | | cc. | Percent | |
| 3 (a) | Amyl | 0.8 | 88.8 | 1,658 |
| 3 (b) | t-Octyl | 1.6 | 90.4 | 1,538 |
| 3 (c) | Thiophenol | 0.88 | 88.4 | 1,538 |
| 3 (d) | t-Dodecyl | 1.6 | 88.8 | 1,734 |
| 3 (e) | t-Butyl | 0.72 | 86.8 | 1,734 |

EXAMPLE 4

Thirteen and five-tenths grams methyl vinyl sulfide and 11.5 grams acrylonitrile were reacted in 100 cc. water using 0.8 gram ammonium persulfate as catalyst, 0.4 gram Aquarex D as emulsifying agent and different modifier compositions as indicated in the following table. The modifier was a mixed-amyl mercaptan. The several copolymerizations were carried out at 40 C. for 17 hours in an atmosphere of nitrogen. The solvent used in the solubility tests was methyl ethyl ketone.

*Table III*

| Modifier | | Yield | Plasticity | Solubility |
|---|---|---|---|---|
| NaHCO₃ | C₅H₁₁.SH | | | |
| Grams | CC. | Percent | | |
| 1.6 | none | 87.6 | 1,452 | Insoluble. |
| 1.6 | 0.16 | 88.0 | 2,154 | Swelled. |
| 1.6 | 0.32 | 75.6 | 3,600 | Increasingly swelled. |

The table shows the low plasticity and insolubility in methyl ethyl ketone of the copolymer obtained without mercaptan, and the effect of increasing amounts of amyl mercaptan.

What we claim is:

1. The process which comprises copolymerizing one molecular equivalent of an alkyl vinyl sulfide having one to four carbon atoms in the alkyl group, with one to five molecular equivalents of a monomer of the class consisting of acrylonitrile, methacrylonitrile and ethacrylonitrile, in the presence of 0.2 to 5.0 parts per hundred parts of total monomer, of a mercaptan of the class consisting of alkyl, cycloalkyl, aryl, furyl, and furfuryl mercaptans, said alkyl and cycloalkyl each containing one to twelve carbon atoms.

2. The process of claim 1 in which there is produced a copolymer constituted of 1 to 1.25 molecular equivalents of the second-mentioned monomer for each molecular equivalent of vinyl sulfide.

3. The process of claim 1, in which the copolymerization is modified with a non-cyclic alkyl mercaptan containing one to twelve carbon atoms.

4. The process of claim 1 in which the mercaptan used is amyl mercaptan.

5. The process of claim 1 in which an alkyl mercaptan is used, the copolymerization is effected in an aqueous emulsion, and the copolymer is formed from 1 to 1.25 molecular equivalents of the second-mentioned monomer for each molecular equivalent of vinyl sulfide, the temperature being 10 to 60° C.

6. The process of claim 1 in which amyl mercaptan is used, the copolymerization is effected in an aqueous emulsion and the copolymer is formed from 1 to 1.25 molecular equivalents of the second-mentioned monomer for each molecular equivalent of vinyl sulfide, the temperature being 10 to 60° C.

7. The process of claim 1 in which an alkyl mercaptan is used, the copolymerization is effected at 10 to 60° C. in an aqueous emulsion of acrylonitrile and methyl vinyl sulfide, and a copolymer is formed from 1 to 1.25 molecular equivalents of acrylonitrile for each molecular equivalent of methyl vinyl sulfide.

8. The process of claim 1 in which amyl mercaptan is used, the copolymerization is effected at 10 to 60° C. in an aqueous emulsion of acrylonitrile and methyl vinyl sulfide, and a copolymer is formed from 1 to 1.25 molecular equivalents of acrylonitrile for each molecular equivalent of methyl vinyl sulfide.

9. A copolymer constituted of copolymerized acrylonitrile and methyl vinyl sulfide in the ratio of 1 to 1.25 molecular equivalents of the former for each molecular equivalent of the latter, which copolymer is soluble in nitromethane at 60° C. to produce a ten per cent solution.

10. Easily worked and readily soluble copolymer constituted of a monomer of the class consisting of acrylonitrile, methacrylonitrile and ethacrylonitrile, and an alkyl vinyl sulfide in which the alkyl group contains one to four carbon atoms, in the ratio of 1 to 1.25 molecular equivalents of the former for each molecular equivalent of the latter.

WENDELL R. CONARD.
CHRIS E. BEST.

REFERENCES CITED

The following references are of record in the file of this patent:

UNITED STATES PATENTS

| Number | Name | Date |
|---|---|---|
| 2,388,160 | Krase | Oct. 30, 1945 |
| 2,395,327 | Hanford | Feb. 19, 1946 |
| 2,434,054 | Roedel | Jan. 6, 1948 |

FOREIGN PATENTS

| Number | Country | Date |
|---|---|---|
| 662,156 | Germany | July 7, 1938 |
| 586,881 | Great Britain | Apr. 3, 1947 |